United States Patent
Bian et al.

(10) Patent No.: US 12,238,077 B2
(45) Date of Patent: Feb. 25, 2025

(54) COMMUNICATION METHOD, INTERNET OF THINGS TERMINAL, GATEWAY DEVICE AND INTERNET OF THINGS SYSTEM

(71) Applicant: BOE Technology Group Co., Ltd., Beijing (CN)

(72) Inventors: Yi Bian, Beijing (CN); Kai Zhao, Beijing (CN); Xianzhen Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 634 days.

(21) Appl. No.: 17/506,543

(22) Filed: Oct. 20, 2021

(65) Prior Publication Data

US 2022/0131841 A1    Apr. 28, 2022

(30) Foreign Application Priority Data

Oct. 23, 2020    (CN) .......................... 202011150100.4

(51) Int. Cl.
*H04L 9/14* (2006.01)
*H04L 9/08* (2006.01)
*H04L 9/40* (2022.01)

(52) U.S. Cl.
CPC ........ *H04L 63/0471* (2013.01); *H04L 9/0872* (2013.01); *H04L 9/14* (2013.01)

(58) Field of Classification Search
CPC ..... H04L 63/0471; H04L 9/0872; H04L 9/14; H04L 9/16; H04L 2209/805; H04L 9/12; H04L 63/0435; H04L 63/101; H04L 9/0861; H04L 9/0866; H04L 9/3297; H04L 63/0876; H04L 67/12; G06F 16/2458; H04W 12/61; H04W 12/08; H04W 12/71; H04W 12/03
See application file for complete search history.

(56) References Cited

U.S. PATENT DOCUMENTS

| | | |
|---|---|---|
| 6,707,914 B1 | 3/2004 | Bell |
| 2013/0312067 A1* | 11/2013 | Ogura ................ H04L 65/1069 709/227 |
| 2019/0121892 A1* | 4/2019 | Beier ................ G06F 16/24547 |

FOREIGN PATENT DOCUMENTS

| | | | |
|---|---|---|---|
| CN | 1784899 A | 6/2006 | |
| CN | 106027189 A | 10/2016 | |
| CN | 107359988 A | * 11/2017 | ........... H04L 9/0631 |
| CN | 108040048 A | 5/2018 | |
| CN | 108777678 A | 11/2018 | |
| CN | 108900530 A | 11/2018 | |
| CN | 111167122 A | 5/2020 | |

(Continued)

OTHER PUBLICATIONS

CN202011150100.4 first office action.

*Primary Examiner* — Khalid M Almaghayreh
(74) *Attorney, Agent, or Firm* — IPro, PLLC (57) ABSTRACT

The present disclosure provides a communication method, an Internet of Things (IoT) terminal, a gateway device and an IoT system. A timestamp and a mask are used for operation, and a key is searched from a key table based on an operation result, such that the key can be dynamically generated based on changes of the timestamp without human intervention. Thus, the security of the IoT system is effectively improved without significantly increasing the computational consumption.

15 Claims, 7 Drawing Sheets

(56) References Cited

FOREIGN PATENT DOCUMENTS

| | | | | | |
|---|---|---|---|---|---|
| CN | 111400738 | B | * | 5/2023 | ............ G06F 21/602 |
| EP | 1873920 | A1 | * | 1/2008 | ........... H03M 13/091 |
| KR | 20180067214 | A | * | 6/2018 | |

* cited by examiner

COMMUNICATION METHOD, INTERNET OF THINGS TERMINAL, GATEWAY DEVICE AND INTERNET OF THINGS SYSTEM

CROSS-REFERENCE TO RELATED APPLICATION

This application claims priority to Chinese Patent Application No. 202011150100.4, filed on Oct. 23, 2020, the entire contents of which are incorporated herein my reference.

TECHNICAL FIELD

The present disclosure relates to the field of Internet of Things (IoT) communication technologies and in particular relates to a communication method, an IoT terminal, a gateway device and an IoT system.

BACKGROUND

With the development of IoT technologies, more and more terminal devices begin to join IoT communication networks, which puts forward higher requirements for the communication security of an IoT system.

SUMMARY

In a first aspect of the present disclosure, a communication method is provided. The communication method is applicable to an IoT terminal and includes:
  acquiring first time information and a first mask;
  generating a first pointer based on the first time information and the first mask;
  searching for a first key from a key table based on the first pointer; and
  encrypting identity information of the IoT terminal using the first key, and sending the encrypted identity information of the IoT terminal and the first time information to a gateway device.

In a second aspect of the present disclosure, a communication method is provided. The communication method is applicable to a gateway device and includes:
  receiving encrypted identity information of an Internet of Things (IoT) terminal and first time information from the IoT terminal;
  acquiring a first mask, and generating a first pointer based on the first time information and the first mask;
  searching for a first key from a key table based on the first pointer;
  acquiring identity information of the IoT terminal by decrypting the encrypted identity information of the IoT terminal using the first key, and conducting authentication.

In a third aspect of the present disclosure, an Internet of Things (IoT) terminal is provided. The IoT terminal includes:
  a communication unit configured to communicate with an IoT terminal;
  a memory configured to store a set of instructions; and
  at least one processor configured to execute the set of instructions so as to perform the method as defined in the second aspect.

In a fourth aspect of the present disclosure, a gateway device is provided. The gateway device includes:
  a communication unit configured to communicate with an Internet of Things (IoT) terminal;
  a memory configured to store a set of instructions; and
  at least one processor configured to execute the set of instructions so as to perform the method as defined in the second aspect.

In a fifth aspect of the present disclosure, an IoT system is provided. The IoT system includes:
  the IoT terminal as defined in the third aspect; and
  the gateway device as defined in the fourth aspect;
  wherein the IoT terminal communicates with the gateway device.

DETAILED DESCRIPTION

For clearer descriptions of the objectives, technical solutions and advantages in the present disclosure, the present disclosure will be further described in detail below with reference to the specific embodiments and the accompanying drawings.

It should be noted that unless otherwise defined, technical terms or scientific terms used in the present disclosure shall be of ordinary meaning as understood by those of ordinary skill in the art to which the present disclosure pertains. The term "first" or "second" or a similar term used in the present disclosure does not denote any order, quantity, or importance, but is merely used to distinguish different components. The term "comprise" or "include", or the like is intended to mean that elements or items which appear before the term include the elements or items listed after the term and their equivalents, and do not exclude other elements or items. The term "connection" or "connected to" or a similar term is not limited to a physical or mechanical connection but may include an electrical connection that is direct or indirect.

A communication encryption method in the related art may have the problem of low security performance or large amount of computation, and thus is not suitable for IoT communication.

Usually, there are several encryption methods in IoT communication, for example, using a fixed static key for encryption, or directly sending a dynamic key in the communication content for encryption, or providing a human-intervened dynamic key (such as short-message authorization code) for encryption.

For the case of using a static key, due to limitations on the cost and the power consumption of an IoT terminal, a complex encryption algorithm may not be used. Therefore, it is easier to acquire a large amount of data by monitoring, and then find the law to crack the static key.

For the case of directly sending a dynamic key in communication, there is also the possibility of being monitored and later acquiring the key.

For the case of using a human-intervened dynamic key, the operating burden of a user is greatly increased, which is not suitable for an unmanned IoT terminal device in most cases.

In view of this, it has become an urgent problem to be solved in the field of IoT to provide a method for dynamically charging a key without sending the key during communication and without human intervention to protect the key with a small amount of computation.

Figure 1:
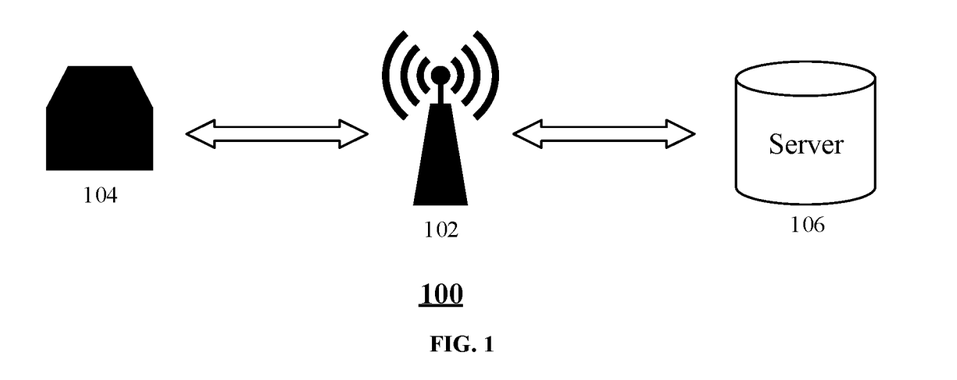
FIG. 1 is an exemplary schematic structural diagram of an IoT system according to an embodiment of the present disclosure.

FIG. 1 is an exemplary schematic structural diagram of an IoT system 100 according to an embodiment of the present disclosure.

The IoT system 100 includes a gateway device 102 and an IoT terminal 104. In some embodiments, the IoT system 100 may further include a server 106.

The gateway device 102, as a gateway or protocol converter, may realize interconnection between the server 106 and the IoT terminal 104 over a network layer.

The IoT terminal 104 may be any IoT device, such as various household appliances (e.g., a television, a refrigerator and an air conditioner), intelligent terminals (e.g., a mobile phone, a tablet computer and a desktop computer), various sensors (e.g., a light sensor, a temperature sensor and a humidity sensor), etc.

In some embodiments, there may be a plurality of gateway devices 102 and a plurality of IoT terminals 104 in the IoT system 100. The gateway device 102 may establish a communication connection with the IoT terminal 104 within its communication range.

Before joining the IoT system 100, the IoT terminal 104 generally needs to send a network access application to the gateway device 102 nearby, and joins the IoT system 100 in response to the gateway device 102 completing authentication of the IoT terminal 104.

In order to improve the security of authentication and give consideration to the computing power of the IoT device at the same time, an embodiment of the present disclosure provides a communication method for authentication.

The gateway device 102 and the IoT terminal 104 may be pre-written with a three-dimensional key table Akey when leaving the factory. The key table may have a size of N*N*N, in which the value of N may be configured based on terminal resources. In some embodiments, each element in the key table may be a 16-bit binary number.

In some embodiments, the gateway device 102 and the IoT terminal 104 may also be pre-written with three 6-byte masks, such as Ma1, Mb1 and Mc1.

In some embodiments, the gateway device 102 may also be written with three 6-byte masks, such as Ma2, Mb2 and Mc2, when being installed. In some embodiments, the masks Ma2, Mb2 and Mc2 may be set by a user with administrator rights.

Figure 2:
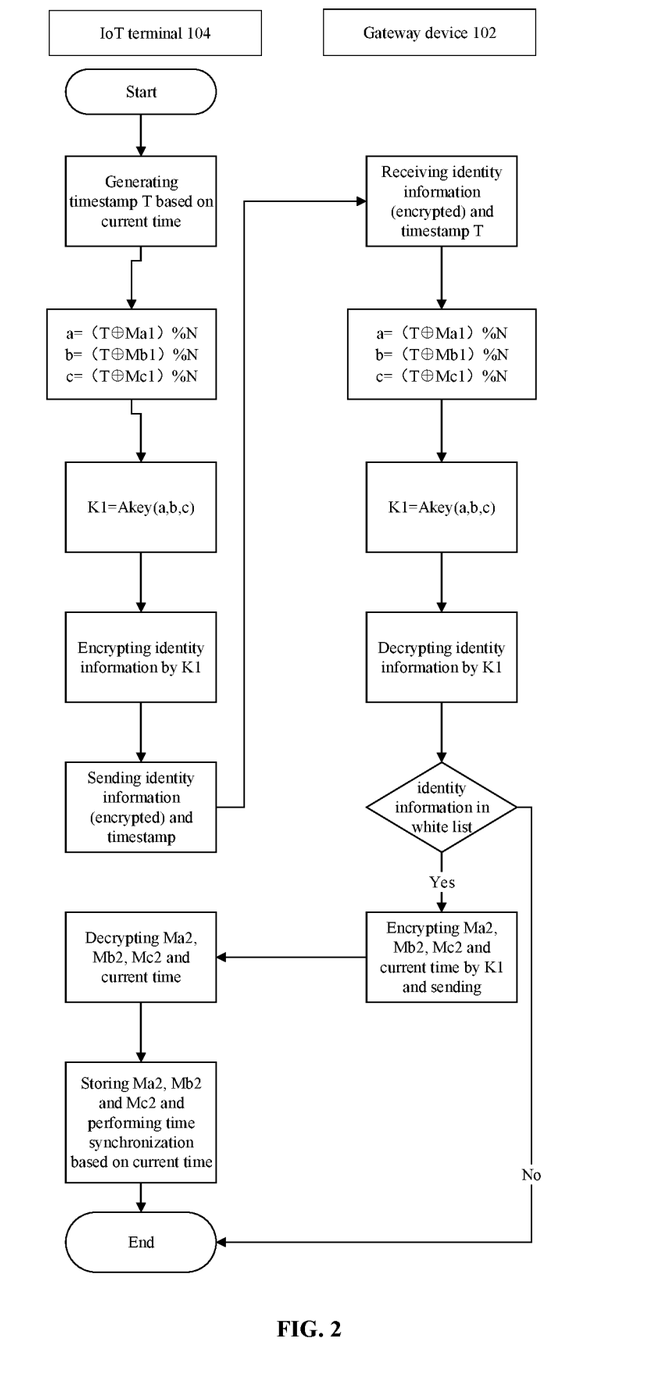
FIG. 2 is a schematic flowchart of an exemplary method for authenticating an IoT terminal entering an IoT system according to an embodiment of the present disclosure.

FIG. 2 is a schematic flowchart of an exemplary method for authenticating an IoT terminal 104 entering an IoT system 100 according to an embodiment of the present disclosure.

As shown in FIG. 2, the IoT terminal 104 may first generate a timestamp T based on current time.

Then, the IoT terminal 104 may perform exclusive OR (XOR) operations on the timestamp T and masks Ma1, Mb1 and Mc1 respectively and then take remainders to N to acquire numerical values a, b and c; and generate pointers (a, b, c) by using the numerical values a, b and c, and then take data at positions pointed by the pointers (a, b, c) in a key table Akey as a current key K1, i.e., Akey (a, b, c). In some embodiments, the pointers may be acquired by performing operations on the current time and the masks Ma1, Mb1 and Mc1. In this step, the timestamp T may not be complete time, but may be part of time. For example, the timestamp T may only include time information of 01 second 01 millisecond when the current time is 13:01 minutes 01 second 01 millisecond on Jan. 1, 2020. In response to receiving the timestamp T (01 second 01 millisecond), the gateway device 102 may acquire complete time by recovering to 13:01 on Jan. 1, 2020 based on the current time. Such processing can make it possible to generate pointers with fewer operations and send fewer messages, which is conducive to improving the computing efficiency of the IoT device and saving resources.

After that, the IoT terminal 104 may encrypt its identity (ID) information using the key K1, and send the timestamp T and the encrypted identity (ID) information to the gateway device 102.

In response to receiving the encrypted identity information of the IoT terminal 104 and the timestamp T, similarly, the gateway device 102 may perform XOR operations on the received timestamp T and the masks Ma1, Mb1 and Mc1 respectively and then take the remainders to N to acquire numerical values a, b and c; and generate pointers (a, b, c) by using the numerical values a, b and c, and then take data at the positions pointed by the pointers (a, b, c) in the key table Akey as the key K1, i.e., Akey (a, b, c). The encrypted identity information of the IoT terminal 104 is then decrypted by using the key K1 to acquire the identity information of the IoT terminal 104.

Then, the gateway device 102 may verify the identity of the IoT terminal 104 by checking whether the decrypted identity information of the IoT terminal 104 is in a white list. In this step, the white list may be preset, or pre-stored in the gateway device 102, or pre-stored in the server 106 and called by the gateway device 102.

If the identity information of the IoT terminal 104 is not in the white list, the network accessing process of the IoT terminal 104 is ended and the IoT terminal 104 does not join the network.

If the identity information of the IoT terminal 104 is in the white list, the gateway device 102 may teed back a network access permission message to the IoT terminal 104, and then establish a communication connection with the IoT terminal 104. In addition, the gateway device 102 may also encrypt the masks Ma2, Mb2, Mc2 and the current time using the key K1, and then send the encrypted masks Ma2, Mb2, Mc2 and the encrypted current time to the IoT terminal 104.

The IoT terminal 104 may acquire the masks Ma2, Mb2, Mc2 and the current time by encryption using the existing key K1, complete time synchronization using the current time, and at the same time, store Ma2, Mb2 and Mc2 for decrypting data during subsequent communication. The time synchronization may be, for example, to update time of a clock chip (e.g., RTC) of the IoT terminal 104 based on the current time so as to ensure the time consistency between the IoT terminal 104 and the gateway device 102.

So far, the network access process of the IoT terminal 104 is completed.

It can be seen that in the embodiment of the present disclosure, the key is acquired from the key table for encryption by the pointers generated by using the time information and the masks, such that the key may be dynamically generated based on changes of the time information. Such a dynamic key may be dynamically generated without increasing users' operations and intervention, which effectively improves the security of an IoT system without significantly increasing the computational consumption, reduces the risk that the IoT terminal may be hijacked by an illegal gateway, and also reduces the risk that the IoT system may be invaded by an illegal terminal.

Since the IoT terminal 104 usually completes timing by using a clock chip (e.g., RTC), and the clock chip generally has a timing error, in order to avoid a timing error between the gateway device 102 and the IoT terminal 104, the IoT terminal 104 needs to regularly re-access the network. Meanwhile, in some embodiments, the time information sent and received between the gateway device 102 and the IoT terminal 104 uses the timestamp, which may be incomplete time information, and thus a time error between the gateway device 102 and the IoT terminal 104 may be resulted.

Figure 3:
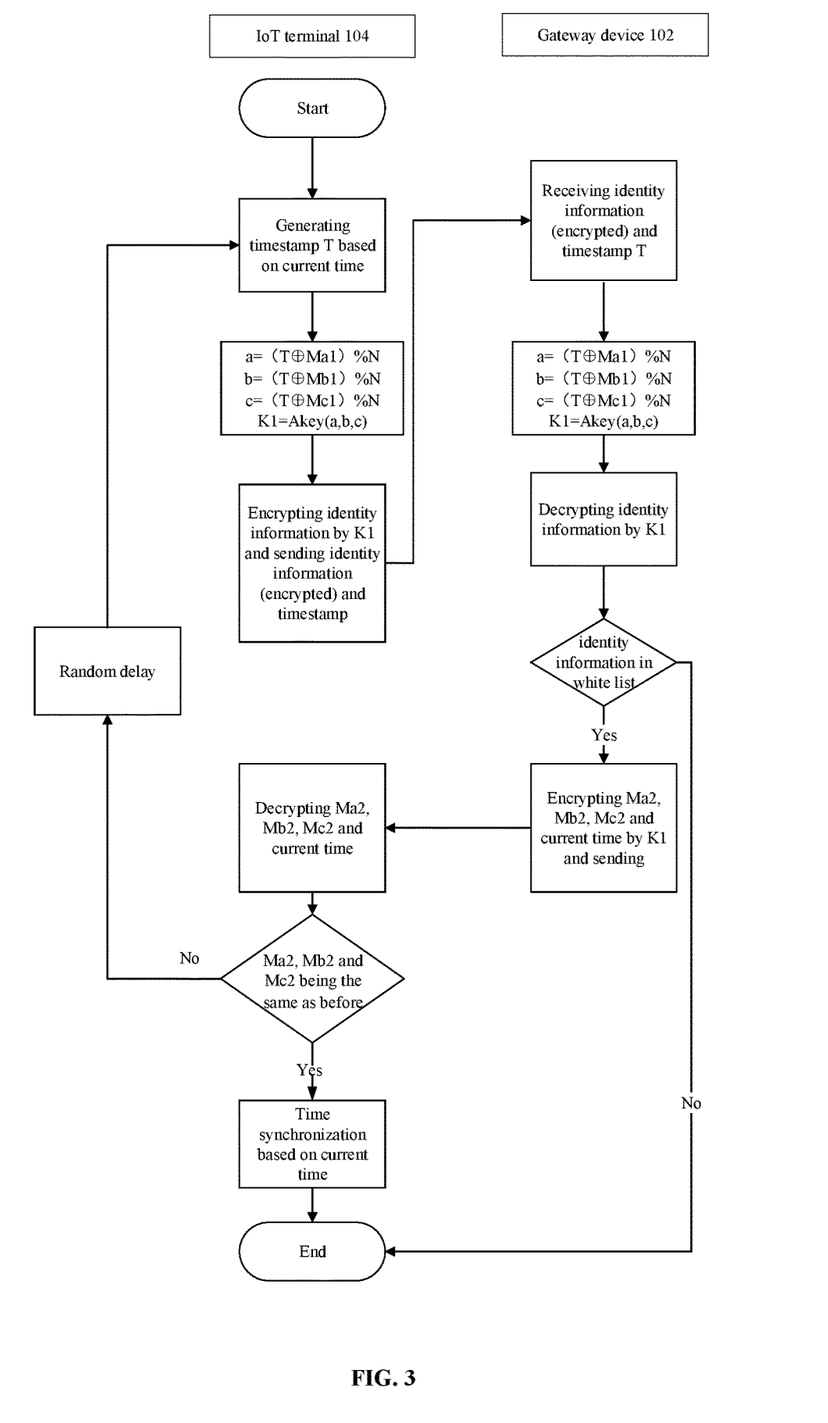
FIG. 3 is a schematic flowchart of an exemplary method for regular time synchronization between an IoT terminal and a gateway device according to an embodiment of the present disclosure.

FIG. 3 is a schematic flowchart of an exemplary method for time synchronization between an IoT terminal 104 and a gateway device 102 according to an embodiment of the present disclosure.

As shown in FIG. 3, the IoT terminal 104 regularly generates the timestamp T based on the current time according to a preset cycle.

Then, the IoT terminal 104 may perform XOR operations on the timestamp T and the masks Ma1, Mb1 and Mc1 respectively and taking the remainders to N to acquire numerical values a, b and c. Besides, the IoT terminal 104 may generate the pointers (a, b, c) based on the numerical values a, b, and c, find and take data at the positions pointed by the pointers in the key table Akey based on the pointers (a, b, c) as the key K1, i.e., Akey (a, b, c).

Then, the IoT terminal 104 may encrypt its identity (ID) information using the key K1, and send the encrypted identity information and the timestamp T to the gateway device 102.

In response to receiving the encrypted identity information of the IoT terminal 104 and the timestamp T, similarly, the gateway device 102 may perform XOR operations on the received timestamp T and the masks Ma1, Mb1 and Mc1 respectively and take the remainders to N to acquire the numerical values a, b and c; and generate the pointers (a, b, c) by using the numerical values a, b and c, and then take data at positions pointed by the pointers (a, b, c) in the key table Akey as a key K1, i.e., Akey (a, b, c). The encrypted identity information of the IoT terminal 104 is then decrypted by using the key K1 to acquire the identity information of the IoT terminal 104.

Next, the gateway device 102 may check whether the acquired identity information is in a white list or not, and if not, the network accessing process of the IoT terminal 104 is ended, and the IoT terminal 104 does not join the network.

If the identity information of the IoT terminal 104 is in the white list, the gateway device 102 may encrypt the masks Ma2, Mb2 and Mc2 and the current time using the key K1, and then send the encrypted masks Ma2, Mb2 and Mc2 and the encrypted current time to the IoT terminal 104.

In response to receiving the encrypted masks Ma2, Mb2 and Mc2 and the encrypted current time, the IoT terminal 104 may acquire the masks Ma2, Mb2, Mc2 and the current time by decryption using its existing key K1.

The IoT terminal 104 may compare the newly acquired masks Ma2, Mb2 and Mc2 with the previously stored masks Ma2, Mb2 and Mc2, and if they are different, the IoT terminal 104 will restart the process of regular time synchronization after a random delay. In some embodiments, if the masks Ma2, Mb2 and Mc2 are inconsistent by comparison, the IoT terminal 104 needs to temporarily stop the communication connection with the gateway device 102 so as to avoid being attacked by illegal gateway devices.

If the masks Ma2, Mb2 and Mc2 are consistent by comparison, the IoT terminal 104 may complete the time synchronization based on the received current time. The time synchronization may be, for example, to update time of a clock chip (e.g., RTC) of the Ica terminal 104 based on the current time so as to guarantee the time consistency between the IoT terminal 104 and the gateway device 102.

So far, the IoT terminal 104 completes a regular time synchronization.

It can be seen that when the received masks Ma2, Mb2 and Mc2 are compared with the previously recorded masks Ma2, Mb2 and Mc2, if they are found different, the network access will be abandoned, and a network re-access will be carried out after a random delay. Therefore, the correctness of the masks Ma2, Mb2 and Mc2 will be checked during a regular network access, which may prevent the IoT terminal 104 from being hijacked by an illegal gateway device.

The IoT terminal 104 may also communicate with the gateway device 102 normally in response to a successful network access.

Figure 4:
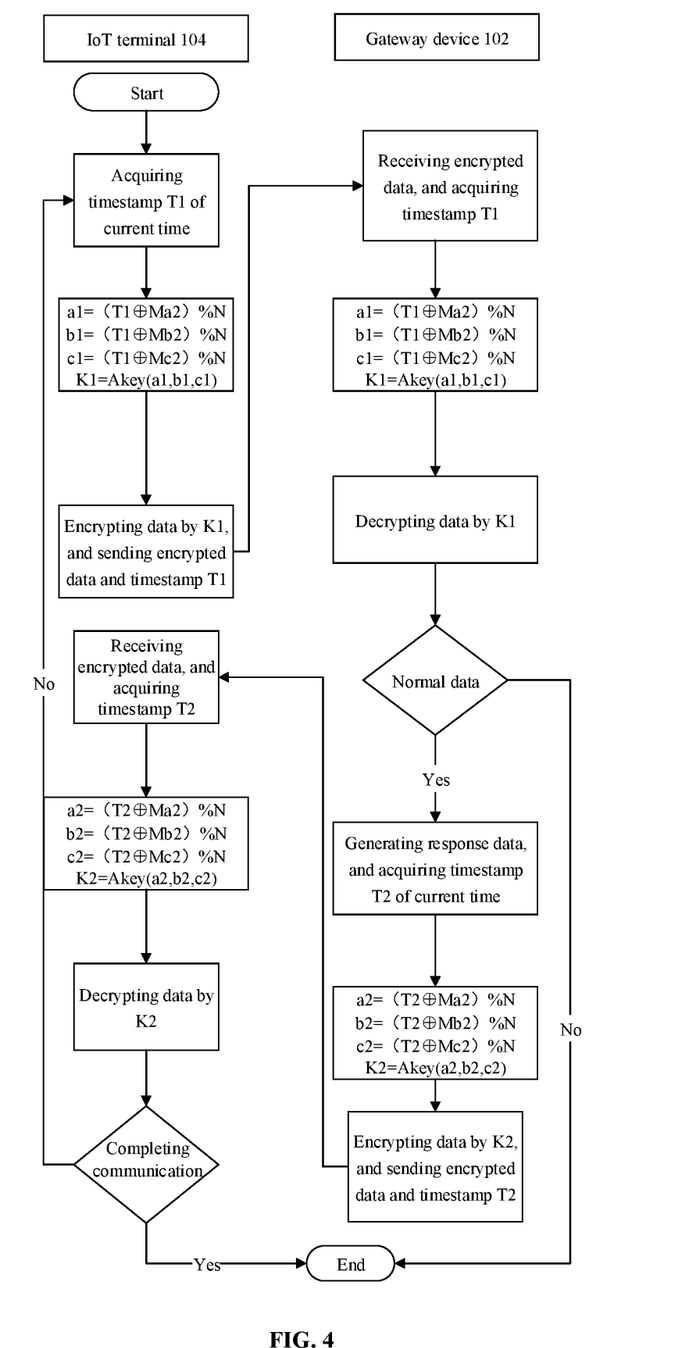
FIG. 4 is a schematic flowchart, of an exemplary method for communication between an IoT terminal and a gateway device according to an embodiment of the present disclosure.

FIG. 4 is a schematic flowchart of an exemplary method for communication between an IoT terminal 104 and a gateway device 102 according to an embodiment of the present disclosure.

As shown in FIG. 4, the IoT terminal 104 may generate a timestamp T1 based on current time, and may perform XOR operations on the timestamp T1 and the masks Ma2, Mb2 and Mc2 respectively and take remainders to N to acquire numerical values a1, b1 and c1. Then, the IoT terminal 104 may generate pointers (a1, b1, c1) by using the numerical values a1, b1 and c1, and may find and take corresponding data in a key table Akey as a key K1 according to positions pointed by the pointers (a1, b1, c1).

Men, the IoT terminal 104 may encrypt, using the key K1, communication data to be sent, and send the encrypted communication data and the timestamp T1 to the gateway device 102.

In response to acquiring the encrypted communication data and the timestamp T1, the gateway device 102 may perform XOR operations on the timestamp T1 and the masks Ma2, Mb2 and Mc2 respectively and then take the remainders to N to acquire numerical values a1, b1 and c1. Afterwards, the gateway device 102 may generate pointers (a1, b1, c1) using the numerical values a1, b1 and c1, find and take the corresponding data in the key table Akey as the key K1 according to the positions pointed by the pointers (a1, b1, c1), and acquire the communication data by decryption using the key K1.

The gateway device 102 may check the normality of the communication data. The communication is ended, if the communication data is abnormal; and the gateway device 102 may generate response data and acquire a timestamp T2 of the current time, if the communication data is normal.

The gateway device 102 may perform XOR operations on the timestamp T2 and masks Ma2, Mb2 and Mc2 respectively and then take remainders to N to acquire numerical values a2, b2 and c2. Afterwards, the gateway device 102 may generate pointers (a2, b2, c2) using the numerical values a2, b2 and c2, find and take corresponding data in the key table Akey as a key K2 according to positions pointed by the pointers (a2, b2, c2), encrypt the response data using the key K2, and then send the encrypted response data and the timestamp T2 to the IoT terminal 104.

In response to acquiring the encrypted response data and the timestamp T2, the IoT terminal 104 may perform XOR operations on the timestamp T2 and the masks Ma2, Mb2 and Mc2 stored therein respectively, and then take the remainders for N to acquire the numerical values a2, b2 and c2. Afterwards, the IoT terminal 104 may generate pointers (a2, b2, c2) using the numerical values a2, b2, c2, find and take the corresponding data in the key table Akey as the key K2 according to the positions pointed by the pointers (a2, b2, c2), and acquire the response data by decryption using the key K2.

At this time, if the communication between the IoT terminal 104 and the gateway device 102 is completed, the communication may be ended, otherwise, the aforementioned steps are repeated to continue the communication.

The communication method provided by the embodiment of the present disclosure supports bidirectional authentication, i.e., the IoT terminal needs to judge the legitimacy of the gateway device, and the gateway device also needs to judge the legitimacy of the IoT terminal.

According to the communication method provided by the embodiment of the present disclosure, neither the key table key nor the mask is present in the communication, neither of them is intercepted by monitoring and the key is changed based on the current time in each communication, so that the difficulty of reverse cracking by monitoring a large amount of data is greatly increased.

Figure 5:
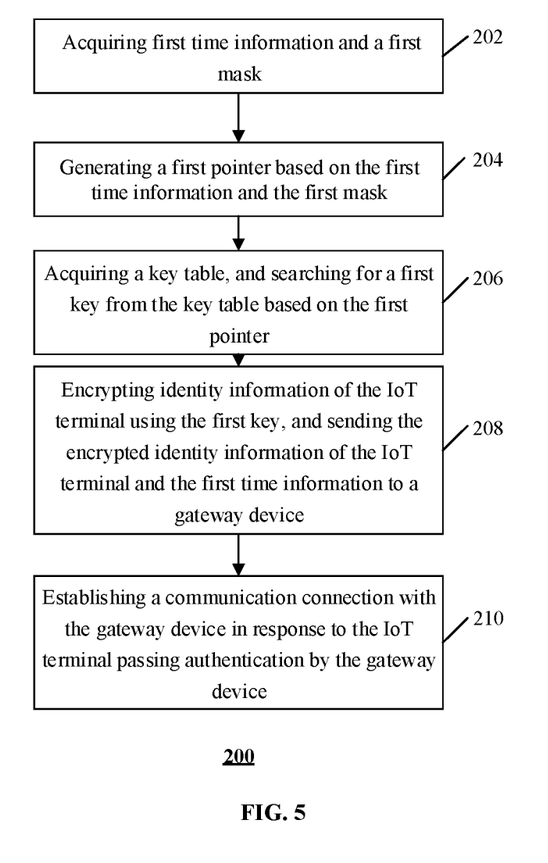
FIG. 5 is an exemplary flowchart of a communication method applicable to an IoT terminal according to an embodiment of the present disclosure.

FIG. 5 is an exemplary flowchart of a communication method applicable to an IoT terminal according to an embodiment of the present disclosure.

As shown in FIG. 5, the communication method 200 is applicable to an IoT terminal 104 and includes the following steps.

In step 202, first time information (e.g., timestamp T in FIG. 2) and a first mask (e.g., masks Ma1, Mb1 and Mc1 in FIG. 2) are acquired.

In step 204, a first pointer (e.g., a, b and c in FIG. 2) is generated based on the first time information and the first mask.

In step 206, a key table (e.g., Akey in FIG. 2) is acquired, and a first key (e.g., key K1 in FIG. 2) is searched from the key table based on the first pointer.

In step 208, identity (ID) information of the IoT terminal 104 is encrypted using the first key, and the encrypted identity information of the IoT terminal 104 and the first time information are sent to the gateway device 102.

In step 210, a communication connection with the gateway device 102 is established in response to the IoT terminal passing authentication by the gateway device 102, and the gateway device 102 verifies the identity of the IoT terminal 104 based on the encrypted identity information of the IoT terminal 104 and the first time information.

In an embodiment of the present disclosure, the timestamp and the mask are used for operation, and the key is searched from the key table based on an operation result, such that the key can be dynamically generated based on changes of the timestamp without manual intervention. Thus, the security of an IoT system is effectively improved without significantly increasing the computational consumption.

In some embodiments, the first mask and the key table are stored in the IoT terminal 104.

Acquiring the first mask includes: calling the first mask from the IoT terminal 104.

Acquiring the key table includes: calling the key table from the IoT terminal 104.

In some embodiments, generating the first pointer based on the first time information and the first mask includes:
performing an XOR operation on the first time information and the first mask; and
acquiring the first pointer by taking a remainder of a result of the XOR operation to N, N being a dimension parameter of the key table.

In an exemplary embodiment, the key table is a three-dimensional key table with a size of N*N*N, and the first mask includes 3 mask values, e.g., Ma1, Mb1 and Mc1.

Performing the XOR operation on the first time information and the first mask includes:
acquiring 3 XOR results by performing XOR operations on the first time information and the 3 mask values respectively.

Acquiring the first pointer by taking remainders of results of the XOR operations to N includes:
acquiring 3 pointer values (e.g., a, b, c) by taking remainders to N based on the 3 XOR results respectively, the 3 pointer values constituting the first pointer (a, b, c).

Data of positions pointed by the first pointer (a, b and c) in the key table is taken as a current first key K1.

In some embodiments, the communication method 200 further includes:
receiving a second mask (e.g., masks Ma2, Mb2, Mc2 in FIG. 2) encrypted by the first key (e.g., key K1 in FIG. 2) sent from the gateway device 102;
acquiring the second mask by decrypting the encrypted second mask using the first key; and
storing the second mask.

In some embodiments, in response to the second mask in the IoT terminal being stored for the first time, the communication method 200 further includes:
receiving second time information (e.g., the current time of the gateway device 102) encrypted by the first key (e.g., key K1 in FIG. 2) sent from the gateway device 102;
acquiring the second time information by decrypting the encrypted second time information using the first key; and
completing time synchronization of the IoT terminal 104 using the second time information. The time synchronization may be, for example, to update the time of a clock chip (e.g., RTC) of the IoT terminal 104 based on the second time information to ensure the time consistency between the IoT terminal 104 and the gateway device 102.

In some embodiments, referring to FIG. 3, in response to a second mask being already stored in the IoT terminal 104, the communication method 200 further includes:
comparing the currently received second mask with the stored second mask, wherein the stored second mask is received from the gateway device when the IoT terminal establishes a communication connection with the gateway device;
completing time synchronization of the IoT terminal using the second time information in response to the second masks being consistent by comparison, wherein the time synchronization may be, for example, to update the time of the clock chip (e.g., RTC) of the IoT terminal 104 based on the second time information to ensure the time consistency between the IoT terminal 104 and the gateway device 102, so that a time error of the IoT terminal 104 working for a period of time is unified by the time information of the gateway device 102, and then the time error therebetween is eliminated; and stopping the communication connection with the gateway device 102 in response to the second masks being inconsistent by comparison.

In some embodiments, referring to FIG. 4, the communication method 200 further includes:

acquiring first communication data and third time information (e.g., timestamp T1 in FIG. 4);

generating a second pointer (e.g., a1, b1, c1 in FIG. 4) based on the third time information and the second mask (e.g., masks Ma2, Mb2, Mc2 in FIG. 4);

searching for a second key (e.g., key K1 in FIG. 4) from the key table based on the second pointer; and encrypting the first communication data using the second key, and sending the encrypted first communication data and the third time information to the gateway device 102.

In some embodiments, the communication method 200 further includes:

receiving second communication data encrypted by a third key (e.g., key K2 in FIG. 4) and fourth time information (e.g., timestamp T2 in FIG. 4) sent from the gateway device 102;

generating a third pointer using the fourth time information (e.g., timestamp T2 in FIG. 4) and the second mask (e.g., masks Ma2, Mb2, Mc2 in FIG. 4);

searching for a third key (e.g., key K2 in FIG. 4) from the key table based on the third pointer; and acquiring the second communication data by decrypting the encrypted second communication data using the third key.

It should be noted that the first communication data may be communication data with communication content information and is sent by the IoT terminal 104 to the gateway device 102, and the second communication data may be response data of the gateway device 102 in response to the first communication data or communication data with new communication content information and is sent by the gateway device 102 to the IoT terminal 104. Specific communication contents of the first communication data and the second communication data are selected according to actual communication requirements and are not specifically limited herein.

It should also be noted that the third time information used by the IoT terminal to generate the second pointer and the fourth time information used by the gateway device to generate the third pointer may be the same or different. In some embodiments, the third time information or the fourth time information may be time information generated by the IoT terminal or the gateway device based on the current time when the communication data needs to be transmitted. In addition, because the third time information or the fourth time information is transmitted while the encrypted data is transmitted, the data receiving party may generate the corresponding pointer based on the received third time information or fourth time information. Therefore, from this perspective, in some embodiments, the third time information and the fourth time information may also be any specified time information. However, in order to ensure the dynamic nature of the key, the time information may need to be changed accordingly as time goes by to avoid arousing security problems.

Figure 6:
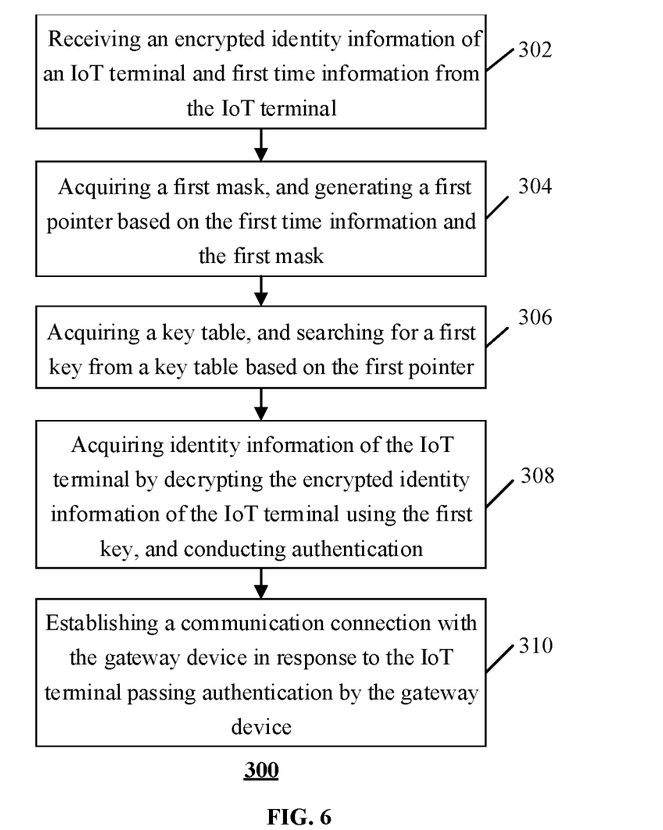
FIG. 6 is an exemplary flowchart of a communication method applicable to a gateway device according to an embodiment of the present disclosure.

FIG. 6 is an exemplary flowchart of a communication method applicable to a gateway device 102 according to an embodiment of the present disclosure.

As shown in FIG. 6, the communication method 300 is applicable to a gateway device, and includes the following steps.

In step 302, encrypted identity information of an IoT terminal and first time information sent from the IoT terminal are received.

In step 304, a first mask is acquired and a first pointer is generated based on the first time information and the first mask.

In step 306, a key table is acquired and a first key is searched from the key table based on the first pointer.

In step 308, identity information of the IoT terminal is acquired by decrypting the encrypted identity information of the IoT terminal using the first key, and authentication is conducted.

In step 310, a communication connection with the IoT terminal is established in response to the identity information passing authentication.

In the embodiment of the present disclosure, operations are performed using the timestamp and the masks, and the key is searched from the key table based on operation results, such that the key can be dynamically generated based on changes of the timestamp without manual intervention. Thus, the security of an IoT system is effectively improved without significantly increasing the computational consumption.

In some embodiments, generating the first pointer based on the first time information and the first mask includes:

performing an XOR operation on the first time information and the first mask; and acquiring the first pointer by taking a remainder of a result of the XOR operation to N, N being a dimension parameter of the key table.

In an exemplary embodiment, the key table is a three-dimensional key table with a size of N*N*N, and the first mask includes 3 mask values.

Performing the XOR operation on the first time information and the first mask includes:

acquiring 3 XOR results by performing XOR operations on the first time information and the 3 mask values respectively.

Acquiring the first pointer by taking the remainder to N based on the result of the XOR operation includes:

acquiring 3 pointer values by taking remainders to N based on the 3 XOR results respectively, the 3 pointer values constituting the first pointer.

In some embodiments, the communication method 300 further includes:

acquiring a second mask, and encrypting the second mask using the first key; and returning the encrypted second mask to the IoT terminal.

In some embodiments, the first mask, the key table and the second mask are stored in the gateway device;

acquiring the first mask includes: calling the first mask from the gateway device;

acquiring the key table includes: calling the key table from the gateway device; and acquiring the second mask includes: calling the second mask from the gateway device.

In some embodiments, the communication method 300 further includes:

acquiring second time information and encrypting the second time information using the first key; and returning the encrypted second time information to the IoT terminal to make the IoT terminal complete time synchronization based on the second time information.

In some embodiments, the communication method 300 further includes:

receiving encrypted first communication data and third time information sent from the IoT terminal;

generating a second pointer based on the third time information and the second mask;

searching for a second key from the key table based on the second pointer; and acquiring the first communication data by decrypting the encrypted first communication data using the second key.

In some embodiments, the communication method 300 further includes:

acquiring second communication data and fourth time information;

generating a third pointer using the fourth time information and the second mask;

searching for a third key from the key table based on the third pointer;

encrypting the second communication data using the third key; and sending encrypted second communication data and the fourth time information to the terminal.

It should be noted that the first communication data may be communication data with communication content information and is sent by the IoT terminal 104 to the gateway device 102, and the second communication data may be response data of the gateway device 102 in response to the first communication data or communication data with new communication content information and is sent by the gateway device 102 to the IoT terminal 104. Specific communication contents of the first communication data and the second communication data are selected according to actual communication requirements, and are not specifically limited herein.

It should also be noted that the third time information used by the IoT terminal to generate the second pointer and the fourth time information used by the gateway device to generate the third pointer may be the same or different. In some embodiments, the third time information or the fourth time information may be time information generated by the IoT terminal or the gateway device based on the current time when the communication data needs to be transmitted. In addition, because the third time information or the fourth time information is transmitted while the encrypted data is transmitted, the data receiving party may generate the corresponding pointer based on the received third time information or fourth time information. Therefore, from this perspective, in some embodiments, the third time information and the fourth time information may also be any specified time information. However, in order to ensure the dynamic nature of the key, the time information may need to be changed accordingly as time goes by to avoid arousing security problems.

In addition, it should be noted that the method according to the present disclosure may be executed by a single device, such as a computer or a server. The method according to this embodiment is also applicable to a distributed scenario, in which the method is accomplished by the mutual coordination of a plurality of devices. In the case of such a distributed scenario, one of the plurality of devices may only execute one or more steps of the method according to the present disclosure; and the plurality of devices will interact with each other to accomplish the described method.

The specific embodiments of the present disclosure are described above. Other embodiments shall fall within the scope of the appended claims. In some cases, the operations and steps recorded in the claims can be executed in an order different from that in the embodiments to achieve a desired result as well. In addition, the processes depicted in the accompanying drawings are not necessarily performed based on the illustrated specific order or continuous order to achieve the desired result. In some embodiments, multi-task processing and parallel processing are also possible or may be advantageous.

Referring to FIG. 1, an embodiment of the present disclosure further provides an IoT terminal 104, including:

a communication unit configured to communicate with a gateway device;

a memory configured to store one or more sets of instructions; and at least one processor configured to execute the one or more sets of instructions so as to perform the communication method 200.

Referring to FIG. 1, an embodiment of the present disclosure further provides a gateway device 102, including:

a communication unit configured to communicate with a gateway device;

a memory configured to store one or more sets of instructions; and at least one processor configured to execute the one or more sets of instructions so as to perform the communication method 300.

Based on the same inventive concept, corresponding to the method of any of the above embodiments, the present disclosure further provides an electronic device, including a memory, a processor and a computer program stored in the memory and operable on the processor, wherein the processor implements the communication method 200 or the communication method 300 described in any of the above embodiments when executing the program.

Figure 7:
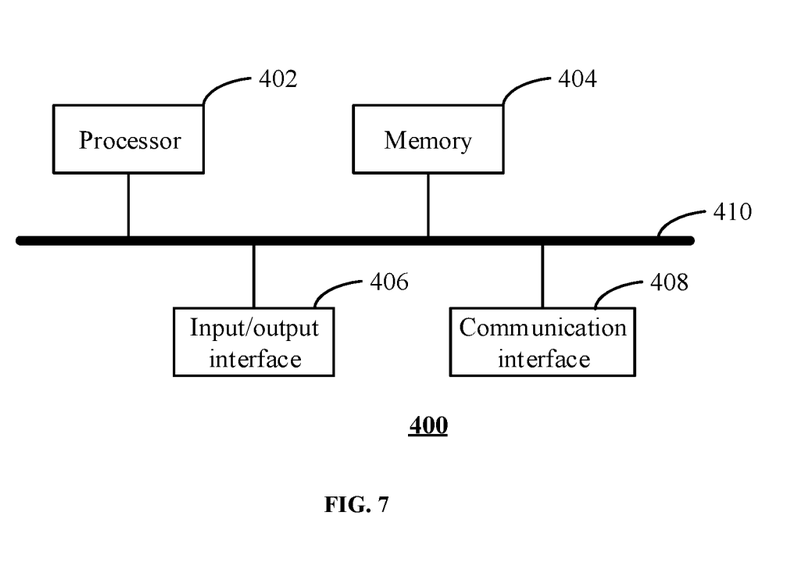
FIG. 7 is a schematic diagram of a more specific hardware structure of an electronic device according to an embodiment of the present disclosure.

FIG. 7 is a schematic diagram of a more specific hardware structure of an electronic device 400 according to an embodiment. The device may include a processor 402, a memory 404, an input/output interface 406, a communication interface 408 and a bus 410. The processor 402, the memory 404, the input/output interface 406 and the communication interface 408 are in communication connection with one another in the device by the bus 410.

The processor 402 may be implemented by means of a general central processing unit (CPU), a microprocessor, an application specific integrated circuit (ASIC), or one or more integrated circuits to execute related programs so as to realize the technical solutions provided by the embodiments of the present disclosure.

The memory 404 may be implemented in the form of a read-only memory (ROM), a random access memory (RAM), a static storage device, a dynamic storage device, etc. The memory 404 may store an operating system and other application programs. When the technical solutions provided by the embodiments of the present disclosure are implemented by software or firmware, relevant program codes are stored in the memory 404 and called for execution by the processor 402.

The input/output interface 406 is configured to be connected with an input/output module to realize information input and output. The input/output/module may be configured in a device (not shown in the figure) as a component, or externally connected to the device to provide corresponding functions. An input device may include a keyboard, a mouse, a touch screen, a microphone, various sensors, and the like, and an output device may include a display, a speaker, a vibrator, an indicator light, and the like.

The communication interface 408 is configured to be connected with a communication module (not shown in the figure) to realize communication interaction between the device and other devices. The communication module may realize communication in a wired manner (e.g., USB and a network cable), or a wireless manner (e.g., a mobile network, WIFI and Bluetooth).

The bus 410 includes a path by which information is transmitted among the various components of the device (e.g., the processor 402, the memory 404, the input/output interface 406 and the communication interface 408).

It should be noted that although the above device only shows the processor 402, the memory 404, the input/output interface 406, the communication interface 408, and the bus 410, in practice, the device may further include other components required for normal operation. In addition, those skilled in the art can understand that the above-mentioned device may only include the components required for implementing the solutions of the embodiments of the present disclosure, rather than all the components shown in the figure.

The electronic device in the foregoing embodiment is configured to implement the corresponding communication method in any of the above embodiments, and has the beneficial effects of the corresponding method embodiment, which will not be repeated herein.

Based on the same inventive concept, corresponding to the method of any of the above embodiments, the present disclosure further provides a non-transitory computer-readable storage medium storing a computer instruction, and the computer instruction is intended to cause a computer to execute the communication method according to any of the above embodiments.

The computer-readable medium in this embodiment includes both persistent and non-persistent and removable and non-removable media that may be implemented in any method or technology for storage of information. The information may be computer-readable instructions, data structures, program modules or other data. Examples of the computer storage medium include, but are not limited to, a phase-change RAM (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, compact disk read-only memory (CD-ROM), a digital versatile disk (DVD) or other optical storage, magnetic cassettes, a magnetic tape, a magnetic disk storage or other magnetic storage devices, or any other non-transmission media that can be used to store information for access by a computing device.

The computer instruction stored in the storage medium of the foregoing embodiment is intended to cause the computer to execute the communication method as described in any of the above embodiments, and has the beneficial effects of the corresponding method embodiment, which will not be repeated herein.

A person of ordinary skill in the art should understand that the discussion of any of the above embodiments is merely for an exemplary purpose, and is not intended to imply that the scope of the present disclosure (including the claims) is limited to these examples. Under the concept of the present disclosure, the above embodiments or the technical features in different embodiments may also be combined; and the steps may be accomplished in any order. Moreover, many other variations in different aspects of the present disclosure as described above are possible but not provided in the detail for the sake of brevity.

In addition, for the brevity of description and discussion and in order not to obscure the present disclosure, the well-known power/ground connections to the integrated circuit (IC) chips and other components may or may not be illustrated in the provided drawings. In addition, the devices may be illustrated in the form of block diagrams in order not to obscure the present disclosure, and the consideration is also given to the fact that the details about the embodiments of the devices in these block diagrams are highly dependent on the platform on which the present disclosure will be implemented (that is, these details should be fully within the understanding of those skilled in the art). In the case where the specific details (for example, the circuits) are set forth to describe the exemplary embodiments of the present disclosure, it is obvious to those skilled in the art that the present disclosure may be implemented without these specific details or with these specific details changed. Therefore, these descriptions should be considered illustrative rather than limiting.

Although the present disclosure has been described in combination with the specific embodiments of the present disclosure, many substitutions, modifications and variations of these embodiments will be apparent to those of ordinary skill in the art based on the foregoing description. For example, the discussed embodiments may be used in other memory architectures (for example, a dynamic RAM (DRAM)).

The present disclosure is intended to cover all such substitutions, modifications and variations that fall within the broad scope of the appended claims. Therefore, any omission, modification, equivalent substitution, improvement and the like made within the spirit and principle of the present disclosure shall be construed as being included in the protection scope of the present disclosure.

What is claimed is:

1. A communication method, being applicable to an Internet of Things (IoT) terminal, comprising:
    acquiring first time information and a first mask;
    generating a first pointer based on the first time information and the first mask;
    searching for a first key from a key table based on the first pointer;
    encrypting identity information of the IoT terminal using the first key, and sending the encrypted identity information of the IoT terminal and the first time information to a gateway device;
    wherein the generating the first pointer based on the first time information and the first mask comprises:
    performing an exclusive OR (XOR) operation on the first time information and the first mask; and
    acquiring the first pointer by taking a remainder of a result of the XOR operation to N, N being a dimension parameter of the key table.

2. The method according to claim 1, wherein the key table is a three-dimensional key table with a size of N*N*N, and the first mask comprises 3 mask values; the performing the XOR operation on the first time information and the first mask comprises: acquiring 3 XOR results by performing XOR operations on the first time information and the three mask values respectively; and the acquiring the first pointer by taking the remainder of the result of the XOR operation to N comprises: acquiring 3 pointer values by taking remainders of the 3 XOR results to N respectively, the 3 pointer values constituting the first pointer.

3. The method according to claim 1, further comprising:
receiving a second mask encrypted by the first key sent from the gateway device;
acquiring the second mask by decrypting the encrypted second mask using the first key; and
storing the second mask.

4. The method according to claim 3, wherein in response to the second mask in the IoT terminal being stored for the first time, the method further comprises:
receiving second time information encrypted by the first key sent from the gateway device;
acquiring the second time information by decrypting the encrypted second time information using the first key; and
completing time synchronization of the IoT terminal using the second time information.

5. The method according to claim 4, wherein in response to a second mask already being stored in the IoT terminal, the method further includes:
comparing currently received second mask with the stored second mask, wherein the stored second mask is received from the gateway device when the IoT terminal establishes a communication connection with the gateway device;
completing time synchronization of the IoT terminal by using the second time information in response to the second masks being consistent by comparison; and
stopping the communication connection with the gateway device in response to the second masks being inconsistent by comparison.

6. The method according to claim 3, further comprising:
acquiring first communication data and third time information;
generating a second pointer based on the third time information and the second mask;
searching for a second key from the key table based on the second pointer; and
encrypting the first communication data using the second key, and sending the encrypted first communication data and the third time information to the gateway device.

7. The method according to claim 6, further comprising:
receiving second communication data encrypted by a third key and fourth time information sent from the gateway device;
generating a third pointer using the fourth time information and the second mask;
searching for a third key from the key table based on the third pointer; and
acquiring the second communication data by decrypting the encrypted second communication data using the third key.

8. A communication method, being applicable to a gateway device, comprising:
receiving encrypted identity information of an Internet of Things (IoT) terminal and first time information sent from the IoT terminal;
acquiring a first mask and generating a first pointer based on the first time information and the first mask;
searching for a first key from a key table based on the first pointer;
acquiring identity information of the IoT terminal by decrypting the encrypted identity information of the IoT terminal using the first key, and conducting authentication;
wherein the generating the first pointer based on the first time information and the first mask comprises:
performing an exclusive OR (XOR) operation on the first time information and the first mask; and
acquiring the first pointer by taking a remainder of a result of the XOR operation to N, N being a dimension parameter of the key table.

9. The method according to claim 8, wherein the key table is a three-dimensional key table and has a size of N*N*N, and the first mask comprises 3 mask values; the performing the XOR operation on the first time information and the first mask comprises: acquiring 3 XOR results by performing XOR operations on the first time information and the 3 mask values respectively; and the acquiring the first pointer by taking the remainder of the result of the XOR operation to N comprises: acquiring 3 pointer values by taking remainders of the 3 XOR results to N respectively, the 3 pointer values constituting the first pointer.

10. The method according to claim 8, further comprising:
acquiring a second mask and encrypting the second mask using the first key; and
returning the encrypted second mask to the IoT terminal.

11. The method according to claim 10, further comprising:
acquiring second time information and encrypting the second time information using the first key; and
returning the encrypted second time information to the IoT terminal to make the IoT terminal complete time synchronization based on the second time information.

12. The method according to claim 11, further comprising:
receiving encrypted first communication data and third time information sent from the IoT terminal;
generating a second pointer based on the third time information and the second mask;
searching for a second key from the key table based on the second pointer; and
acquiring the first communication data by decrypting the encrypted first communication data using the second key.

13. The method according to claim 12, further comprising:
acquiring second communication data and fourth time information;
generating a third pointer using the fourth time information and the second mask;
searching for a third key from the key table based on the third pointer;
encrypting the second communication data using the third key; and
sending encrypted second communication data and the fourth time information to the IoT terminal.

14. An Internet of Things (IoT) terminal, comprising:
a communication unit configured to communicate with a gateway device;
a memory configured to store one or more sets of instructions; and
at least one processor configured to execute the one or more sets of instructions so as to perform the following method:
acquiring first time information and a first mask;
generating a first pointer based on the first time information and the first mask;
acquiring a key table, and searching for a first key from the key table based on the first pointer;
encrypting identity information of the IoT terminal using the first key, and sending the encrypted identity information of the IoT terminal and the first time information to a gateway device;

establishing a communication connection with the gateway device in response to the IoT terminal passing authentication by the gateway device, the gateway device verifying the identity of the IoT terminal based on the encrypted identity information of the IoT terminal and the first time information;

wherein the generating the first pointer based on the first time information and the first mask comprises:

performing an exclusive OR (XOR) operation on the first time information and the first mask; and acquiring the first pointer by taking a remainder of a result of the XOR operation to N, N being a dimension parameter of the key table.

15. The IoT terminal according to claim 14, wherein the method further comprises:

receiving a second mask encrypted by the first key sent from the gateway device;

acquiring the second mask by decrypting the encrypted second mask using the first key; and storing the second mask.

\* \* \* \* \*